May 22, 1956        S. G. BUDAI        2,746,109

STRUCTURAL FASTENER ELEMENTS

Filed Aug. 23, 1951

INVENTOR.
STEVE G. BUDAI,
BY

ATTORNEYS.

United States Patent Office 2,746,109
Patented May 22, 1956

2,746,109

STRUCTURAL FASTENER ELEMENTS

Steve G. Budai, Cincinnati, Ohio, assignor, by mesne assignments, to The Globe-Wernicke Co., a corporation of Ohio Application August 23, 1951, Serial No. 243,261

2 Claims. (Cl. 24—73)

This invention relates to fastening elements for flexible office work space and partition structures and the like. In my copending application, Serial No. 560,927, filed January 16, 1956, I have disclosed at considerable length a structure comprising desk units and table units which can be combined together and which can be combined with partition structures to provide a plurality of L-shaped work spaces.

The desk and table units and the partition structures disclosed in said copending application are of sheet metal and are arranged so that they may be assembled and disassembled without the use of special skills and special tools. One of the factors which makes it possible to assemble and disassemble the units easily is the use of special fastening elements of simple construction which join the various elements of the structure together.

It is therefore an object of the present invention to provide fastening elements which, while useful in various applications, are particularly useful in securing together the various component parts of a flexible office partition structure including desk and table units.

This and other objects of the invention which will be pointed out in more detail hereinafter or which will appear to one skilled in the art upon reading these specifications, I accomplish by that certain construction and arrangement of parts of which I shall now describe certain exemplary embodiments.

Reference is made to the drawing forming a part hereof and in which.

Briefly, in the practice of my invention, I provide clip or hook members which are preferably made of sheet metal and which are extremely simple in construction and simple in their application to the structures to be secured together.

Figure 1:
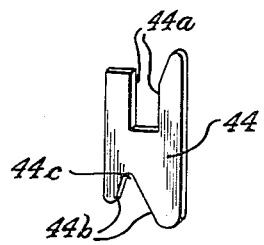
Figure 1 is a perspective view of a clip member according to the invention.
Figure 2:
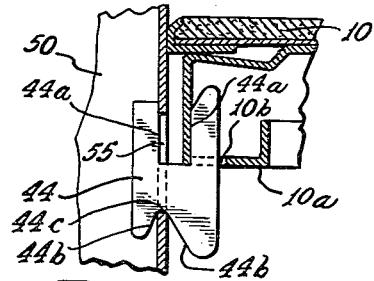
Figure 2 is a fragmentary cross-sectional view through two members to be clipped together showing the clip member of Figure 1 in use.

Referring particularly to Figures 1 and 2, the clip element 44 is designed for fastening either a table or desk unit to a partition member. In Figure 2, a post unit is indicated at 50 and it is provided with a slot 55. A desk or table unit is indicated at 10 and it is shown as having a flange 10a underneath the desk or table top, provided with a slot 10b. To assemble the desk or table unit 10 to the post member 50, the member 44 is canted and inserted into the slot 55. The desk or table unit is then hooked on, as shown in Figure 2, by means of the slot 10b.

The hook member 44 may also be used in connection with such partition structures to hook a shelf structure to a unit post structure in the same manner.

As will be clear from Figures 1 and 2, the member 44 is simply a flat piece of sheet metal presenting oppositely directed pairs of tines, one pair having parallel inner sides, as at 44a, and the other pair having divergent inner sides, as at 44b, defining a notch 44c which lies substantially on a line with one of the inner sides 44a. As seen in Figure 2, the notch 44c fits against one end of the slot 55 and the inner sides 44a extend parallel to the face of the post 50 having the slot 55.

Figure 3:
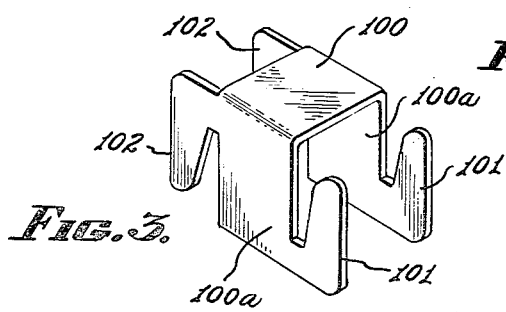
Figure 3 is a perspective view of a hook member according to the invention by means of which two structural elements may be joined together.
Figure 4:
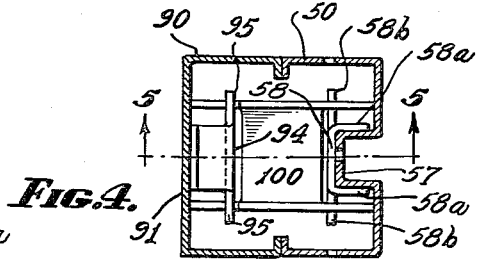
Figure 4 is a cross-sectional view through a post member of a partition structure showing the hook member of Figure 3 in position, taken on the line 4—4 of Figure 5.
Figure 5:
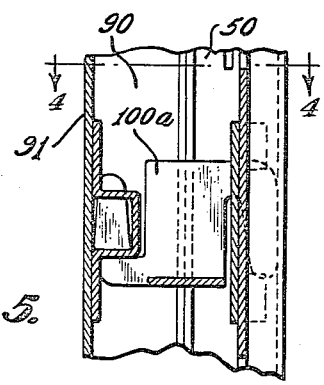
Figure 5 is a fragmentary cross-sectional view of the same taken on the line 5—5 of Figure 4.

Coming now to a consideration of Figures 3 to 5 inclusive, the fastening element shown in Figure 3 is a sheet metal member of channel shape having a connecting web 100 and parallel arms 100a from which extend the hook elements 101 and 102. The hook elements 101 extend from the lower ends of the arms 100a to one side of the connecting web and are directed upwardly toward the plane of the web while the hook elements 102 extend from the arms 100a adjacent the web 100 in the opposite direction and are downwardly directed. The devices of Figure 3 are used to connect together the various post elements disclosed in said copending divisional application. A unit post is indicated generally at 50 and an end post is indicated generally at 90. The unit post member has the longitudinal inwardly directed channel 57. Secured to the channel 57 are the hook engaging elements 58. The members 58 are made from sheet metal and are provided with down-turned lips 58a, which engage over the channel member 57. Substantially centrally thereof, they are provided with the laterally extended wing members 58b. The members 58 are suitably secured, as by spot welding, to the channel member 57 and the wings 58b thereof provide elements for engagement by the hook element of Figure 3.

The end post member 90 is similar in its general structure except it does not have the channel 57. The hook engaging elements on the post member 90 differ from those on the post member 50 in that they comprise a member 94 of bridge-like configuration suitably welded or otherwise secured to the post member 90 and centrally thereof provided with the laterally extending wing members 95. The wing members 95 correspond to the wing members 58b and are of the same dimensions and equally spaced from the web 91 of the post member 90.

Thus, in order to secure the post elements together I utilize the member shown in detail in Figure 3. The spacing between the members 101 and the members 102 is slightly greater than the width of the channels 57 and the manner in which they engage is clearly seen in Figures 4 and 5.

It will be understood that modifications may be made without departing from the spirit of the invention and I therefore do not intend to limit myself except as set forth in the claims which follow.

Having now fully described my invention, what I claim as new and desire to secure by Letters Patent is:

1. A fastening element for securing together two slotted sheet metal members consisting of a planar sheet metal member presenting oppositely directed pairs of tines, one pair of said tines having parallel inner sides and the other pair having divergent inner sides defining a notch, the apex of said notch lying substantially on a line with the inner side of one of said first mentioned pair of tines, whereby said element may be engaged in a slotted member with said notch seated against one end of the slot and the inner sides of the first pair of tines extending parallel to the faces of the slotted member.

2. A fastening element comprising a sheet metal member of channel shape having a connecting web and parallel arms, and hook elements extending from the ends of said arms and in the planes of said arms to one side of said connecting web and directed toward the plane of said connecting web, and other hook elements extending from said arms and in the planes of said arms to the other side of said connecting web adjacent said web and directed oppositely to said first mentioned hook elements.

References Cited in the file of this patent

UNITED STATES PATENTS

| | | |
|---|---|---|
| 775,988 | Rinker | Nov. 29, 1904 |
| 1,582,573 | Caldwell | Apr. 27, 1926 |
| 1,585,102 | Langdon | May 18, 1926 |
| 1,714,681 | Loucks | May 28, 1929 |
| 1,892,415 | Ulrich | Dec. 27, 1932 |
| 1,893,537 | Cruze | Jan. 10, 1933 |
| 1,899,509 | Lapin | Feb. 28, 1933 |
| 2,101,551 | Marsh | Dec. 7, 1937 |
| 2,192,160 | Tinnerman | Feb. 27, 1940 |
| 2,260,657 | Bohnsack | Oct. 28, 1941 |
| 2,352,702 | Fowles | July 4, 1944 |
| 2,353,455 | Gisondi | July 11, 1944 |
| 2,446,012 | Kahn | July 27, 1948 |
| 2,489,493 | Kuenzie | Nov. 29, 1949 |
| 2,620,531 | Chandler | Dec. 9, 1952 |
| 2,629,157 | O'Herron | Feb. 24, 1953 |

FOREIGN PATENTS

| | | |
|---|---|---|
| 166,622 | Switzerland | Jan. 15, 1934 |